J. C. MICHAELSON.
TROLLEY CLIP.
APPLICATION FILED JULY 2, 1908.
936,340.
Patented Oct. 12, 1909.
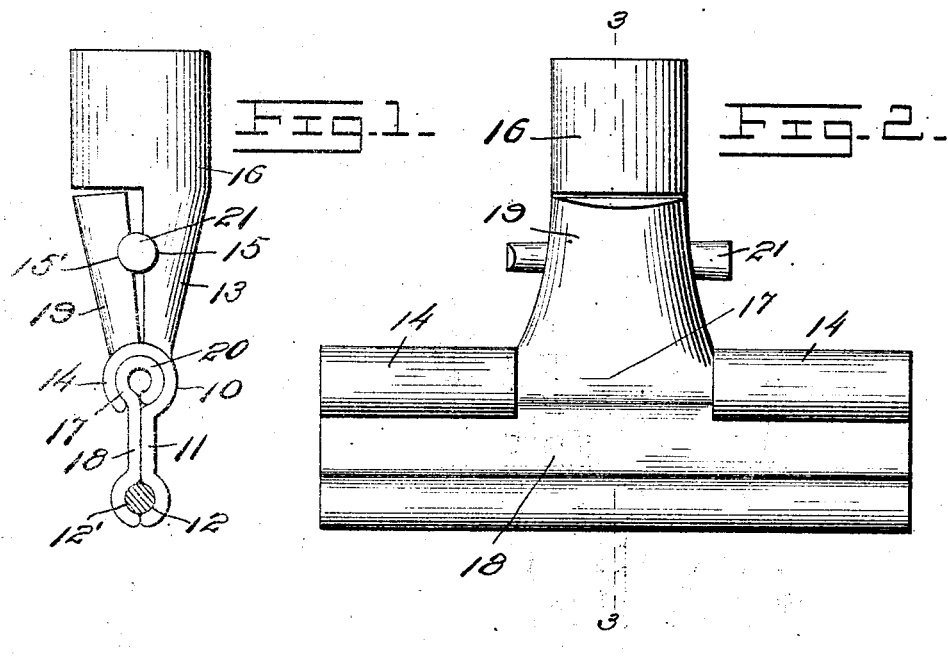
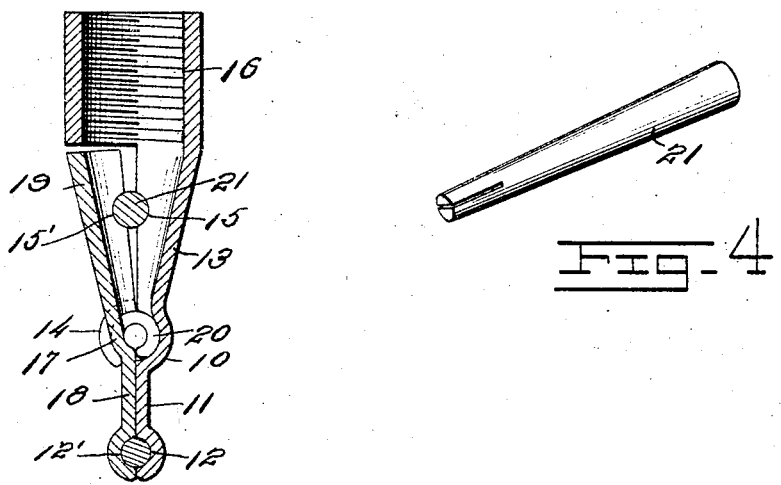
Witnesses
P. L. Armstrong
E. L. Chandlee
Inventor
J. C. Michaelson,
By Woodward & Chandlee
Attorneys

UNITED STATES PATENT OFFICE.

JOHN C. MICHAELSON, OF CHARLESTON, WEST VIRGINIA.

TROLLEY-CLIP.

936,340.
Specification of Letters Patent.
Patented Oct. 12, 1909.

Application filed July 2, 1908. Serial No. 441,617.

*To all whom it may concern:*

Be it known that I, JOHN C. MICHAELSON, a citizen of the United States, residing at Charleston, in the county of Kanawha and State of West Virginia, have invented certain new and useful Improvements in Trolley-Clips, of which the following is a specification.

This invention relates to electrical connections, and more particularly to wire supports and has for its object to provide a trolley clip, of a novel and desirable type.

Another object is to provide a trolley clip which will be adjustable upon a wire without the use of special tools.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is an end view of the clip engaged with a wire, Fig. 2 is a side elevation of the device. Fig. 3 is a longitudinal section, Fig. 4 is a detailed view of the lock pin.

Referring now more particularly to the drawings, there is shown a clip comprising a base section 10 comprising a wire engaging flange 11 having a longitudinally extending groove 12 formed therein adjacent to one edge and having a lateral extension 13 projecting from the side of the flange oppositely of the groove. Hinge flanges 14 are formed on each side of the extension 13. A groove 15 is formed at the base of the extension 13, extending in spaced relation with the flange 11. The outer end portion of the extension 13 is formed into a cylindrical support engaging portion 16 adapted to be threaded and engaged upon a suitable supporting member or otherwise engaged with a support. It will be understood that the portion 16 may be given any form that may be desirable for various fixtures with which it is desired to use the clip.

There is engaged pivotally with the base section 10 a lever member 17 comprising a flange similar to the one 11 and having a groove 12' adapted to register with the groove 12. The pivot member 17 is provided with a laterally extending tongue 19 directed outwardly at an oblique angle with the flange 18, and having a groove 15' thereacross disposed in registry with the groove 15. The inner edge portion of the flange is bent to form a pivot portion 20 which is engaged revolubly within the flanges 14. Co-engaged between the grooves 15 and 15' there is a lock-pin 21 comprising a tapered bar having its reduced end split and bent laterally as shown, to hold the pin surely in engagement with the clip.

In use, the base portion 10 and the pivot portion 17 being assembled, and the portion 16 being engaged with a support, a wire may be disposed between the flanges 11 and 18 and within the grooves 12 and 12' after which the pin 21 may be inserted between the extensions 13 and 19 and driven in tightly to hold the wire securely engaged between the flanges. The split end of the pin 21 is then spread laterally to prevent its disengagement from the clip.

As shown, the device is made from sheet material. The preferable method of assembling the device is to form the rib on the section 18 and a groove in the inner edge of the flange 11 adjacent its junction with the shank 16. The ridge 20 is then disposed in the groove, and the flange 14 bent thereover as shown. It will be apparent however, that numerous mechanical changes in the construction shown may be made, and it will be understood that such mechanical changes tending to facilitate the assembling of the device may be made within the scope of the claims.

What is claimed is:

1. An article of the class described comprising a base flange having a longitudinal groove formed adjacent to one edge thereof, and having a laterally extending shank on its opposite side, said base flange having hinge flanges on opposite sides of the shank, a pivot flange carried by said base member having a longitudinally extending groove therein adapted to register and coöperate with the first named groove in pinching engagement with a wire, said pivot flange having portions bent to form a pivot rib engaged revolubly with said hinge flange of said base member, and having also a laterally extending portion disposed in registry with the shank and a locking-pin adapted for wedging engagement between said laterally extending portion and said shank to hold said flanges in detachable engagement 2. A trolley clamp comprising opposite clamp members stamped from sheet material, said members having integral hinged portions formed thereon coengaged pivotally, and having opposed grooves therein adapted for clamping engagement with a trolley wire, said members having lateral extensions oppositely of the groove, and a pin adapted for wedging engagement therebetween, one of said extensions being adapted for engagement with a support.

3. A trolley clip comprising a plate having a longitudinally extending groove therein, an integral shank member extending from one edge of the plate laterally of the groove, said shank having a transverse groove thereacross spaced from said edge of the plate, said shank being constructed and arranged for engagement with a support; a second plate having a longitudinal groove therein adapted to register with the groove in the first plate, said last plate having a lateral arm at one edge, positioned to extend longitudinally adjacent the shank and being provided with a transverse groove adapted to register with the first named transverse groove, one of said plates having its edge portion adjacent and on opposite sides of the shank and arm directed inwardly and adapted for overlapping coengagement with the adjacent edge of the remaining plate, and a tapered pin adapted for wedging engagement between the arm and the shank in the opposed transverse groove for compression of the grooved portion of the plates against a wire, under the retentive engagement of the inwardly turned edge portion.

In testimony whereof I affix my signature, in presence of two witnesses.

JOHN C. MICHAELSON.

Witnesses:
  C. E. PARRISH,
  GEORGE MITSCH.